(12) United States Patent
DiGiano et al.

(10) Patent No.: US 7,720,946 B2
(45) Date of Patent: May 18, 2010

(54) SYSTEM, METHOD AND COMPUTER PROGRAM PRODUCT FOR ENHANCING AWARENESS OF FELLOW STUDENTS' STATE OF COMPREHENSION IN AN EDUCATIONAL ENVIRONMENT USING NETWORKED THIN CLIENT DEVICES

(75) Inventors: Christopher J. DiGiano, Boulder, CO (US); Jeremy Roschelle, Palo Alto, CA (US); Philip Vahey, San Francisco, CA (US)

(73) Assignee: SRI International, Menlo Park, CA (US)

( * ) Notice: Subject to any disclaimer, the term of this patent is extended or adjusted under 35 U.S.C. 154(b) by 1989 days.

(21) Appl. No.: 09/792,290

(22) Filed: Feb. 21, 2001

(65) Prior Publication Data

US 2002/0116462 A1    Aug. 22, 2002

(51) Int. Cl.
*G06F 15/173* (2006.01)
(52) U.S. Cl. .................... 709/223; 709/203; 709/224
(58) Field of Classification Search .............. 709/206, 709/207, 223–227, 203
See application file for complete search history.

(56) References Cited

U.S. PATENT DOCUMENTS

| | | | | |
|---|---|---|---|---|
| 6,288,753 | B1 * | 9/2001 | DeNicola et al. | 348/586 |
| 6,304,898 | B1 * | 10/2001 | Shiigi | 709/206 |
| 6,411,796 | B1 * | 6/2002 | Remschel | 434/350 |
| 7,222,156 | B2 * | 5/2007 | Gupta et al. | 709/206 |

\* cited by examiner

*Primary Examiner*—Hussein A El-chanti

(57) ABSTRACT

A system, method and computer program product are provided for enhancing participation in an educational environment using networked devices. In one embodiment, feedback is received from a plurality of individual group members regarding material being presented by a group leader utilizing a plurality of networked devices operated by the individual group members. Subsequently, such feedback is processed. The processed feedback is then transmitted to the networked devices operated by the individual group members. Such processed feedback includes the feedback received from each of the individual group members thus allowing each individual group member to view the feedback of other group members. The present invention thus creates an inobtrusive, anonymous means for group members to recognize when their individual perception of the class discussion is actually a shared perception, thereby motivating group members to participate.

18 Claims, 7 Drawing Sheets

SYSTEM, METHOD AND COMPUTER PROGRAM PRODUCT FOR ENHANCING AWARENESS OF FELLOW STUDENTS' STATE OF COMPREHENSION IN AN EDUCATIONAL ENVIRONMENT USING NETWORKED THIN CLIENT DEVICES

FIELD OF THE INVENTION

The present invention relates to networked devices, and more particularly to enhancing student participation in an educational environment using networked devices.

BACKGROUND OF THE INVENTION

In classroom situations, students are often reluctant to ask a question if they feel they are the only student who does not understand. Some of this reluctance derives from basic shyness, or fear of seeming different, or fear of seeming more or less intelligent. In reality, however, many other students have the same difficulty.

There have been numerous electronic-based techniques devised for enabling a teacher more easily to convey information and understanding to a class, and improving class participation. Such electronic classroom teaching aids assist a teacher in breaking through the reluctance that students have to participating actively in class. Enabling students to respond individually and confidentially by electronic means to questions posed by the teacher can help to break through some of the shyness or reluctance a student otherwise may exhibit.

One example of a conventional student response system is disclosed in U.S. Pat. No. 4,764,120. This system is intended to collect data of a limited nature (e.g. responses to multiple-choice questions) from a number of classrooms. Specifically, a student response system is provided which centrally processes student response data received from a plurality of classrooms. The system includes a main controller coupled to an instructor's terminal in each of the classrooms. The system also includes a plurality of student response keypads in each of the classrooms as well as a plurality of student data controllers associated with each of the classrooms wherein each student data controller is coupled to a group of keypads to accumulate data therefrom. The main controller is responsive to commands from an instructor's terminal to control each of the student data controllers in the instructor's classroom to accumulate data from the keypads in a particular manner for transmission to the main controller which then processes the data.

Despite such electronic-based techniques, however, students are often hesitant to participate due to their lack of knowledge regarding the learning difficulties of other students. If students knew, however, that other students were similarly confused, they would be more likely to ask questions, and the learning process would be improved.

DISCLOSURE OF THE INVENTION

A system, method and computer program product are provided for enhancing participation in an educational environment using networked devices. In one embodiment, feedback is received from a plurality of individual group members regarding material being presented by a group leader utilizing a plurality of networked devices operated by the individual group members. Subsequently, such feedback is processed. The processed feedback is then transmitted to the networked devices operated by the individual group members. Such processed feedback includes the feedback received from each of the individual group members thus allowing each individual group member to view the feedback of other group members. The present invention thus creates an inobtrusive, anonymous means for group members to recognize when their individual perception of the class discussion is actually a shared perception, thereby motivating group members to participate.

In one embodiment of the present invention, the networked devices may include thin client devices. Further, such thin client devices may include wireless devices. Still yet, the wireless devices may include hand-held wireless devices such as personal digital assistants (PDAs) each including a stylus.

In another embodiment of the present invention, a multi-dimensional map may be displayed on the devices. Such map may include at least two axes each indicating a parameter of feedback. As such, the students may be allowed to provide feedback by a single touch of the display of the devices.

Still yet, the feedback of each of the individual group members may be displayed on the multi-dimensional map of each of the devices thus allowing each group member to view the feedback of other group members. Optionally, the feedback may be identified based on the individual group members that transmitted the same thus allowing each group member to identify a source of the feedback. Moreover, the processed feedback may be transmitted to the networked devices operated by each of the group members only after the feedback is received therefrom.

As an option, the feedback of each of the individual group members includes answers to multiple choice questions. Further, the feedback may be aggregated such that the aggregation may be transmitted to the group leader. Optionally, an age of the feedback may be monitored such that the feedback may be modified upon the age reaching a predetermined amount.

DESCRIPTION OF THE PREFERRED EMBODIMENTS

Figure 1:
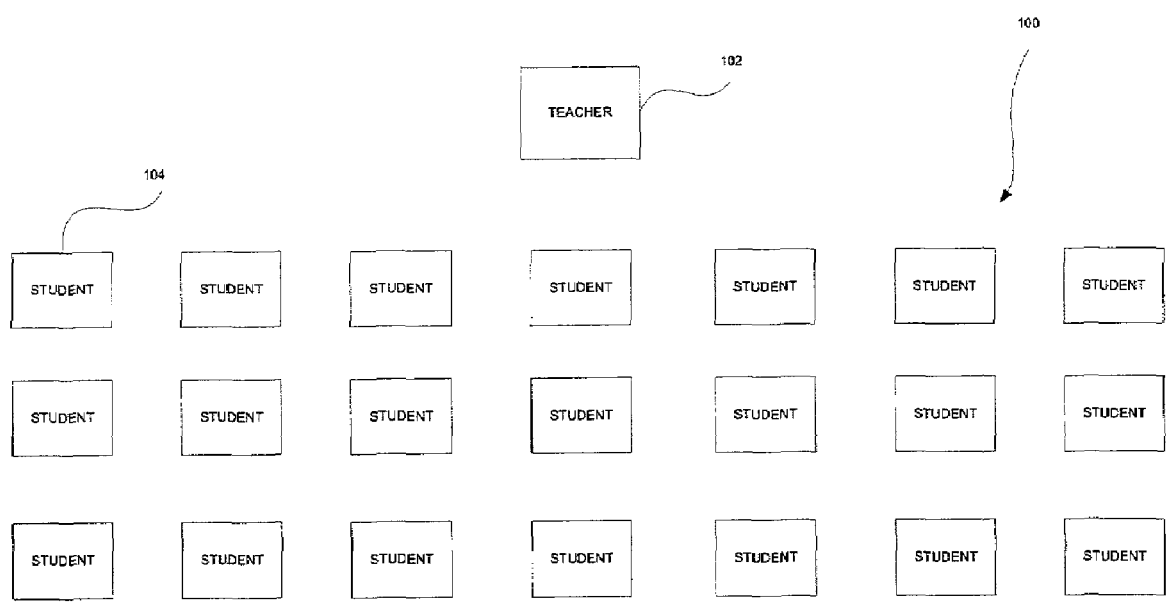
FIG. 1 illustrates one exemplary environment in which the present invention may be implemented.

FIG. 1 illustrates one exemplary environment in which the present invention may be implemented. As shown, an educational environment 100 may be provided with a plurality of students 104 and a teacher 102. It should be noted that any type of environment may be used where a plurality of users are formed in a group which is instructed, addressed, etc. by a head of the group. It should also be understood that the group of students 104 need not necessarily be congregated in a single location.

One exemplary embodiment involves the following system components:

networked thin client devices, one for each group participant a computer or networked thin client device for the group leader a programming language that operates on the client devices a peer-to-peer directional communication capability between client devices a networked server computer a programming language that operates on the server a networking protocol through which the clients and server can send messages to each other, and optionally among clients a data description language in which the clients and server read and write messages for each other, and optionally among clients a display visible by the group leader and participants Descriptions for preferred and alternative embodiments are set forth for each component below; the overall assemblage can be realized in many different combinations without undue difficulty. In particular, alternative embodiments may utilize mixed kinds of devices, mixed kinds of program languages, mixed networking protocols, and mixed data description languages.

Figure 2:
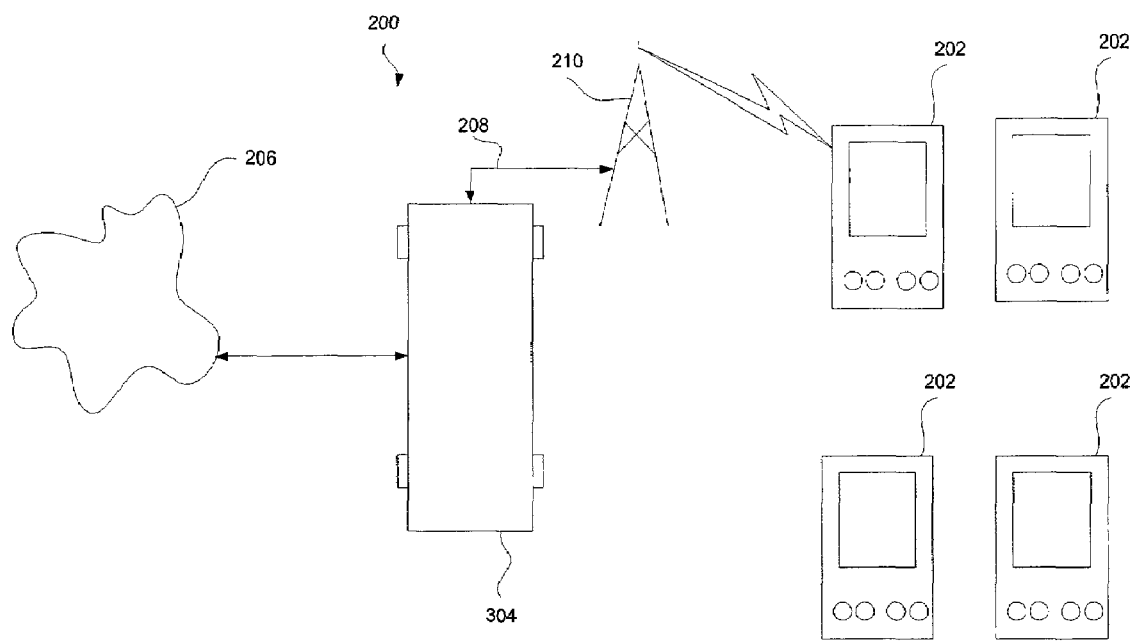
FIG. 2 depicts an exemplary operating environment including one or more thin client devices in connection with a host computer system.

FIG. 2 depicts an exemplary operating environment 200 including one or more thin client devices 202 in connection with a host computer system 204. In one embodiment, each of the students 104 may be equipped with one of the thin client devices 202, and the teacher 102 may be capable of using the host computer system 204. As an option, the teacher 102 may also interface with the host computer system 204 utilizing one of the thin client devices 202. The host computer system 204 may optionally be connected to remote sources of data information on the Internet 206. As an option, the thin client devices 202 may be wireless devices. In such embodiment, the host computer system 204 may include a peripheral interface adapter that provides for the bi-directional transfer of the data via an interconnect line 208 to a transceiver 210 that supports wireless communications with one or more wireless devices.

Figure 3:
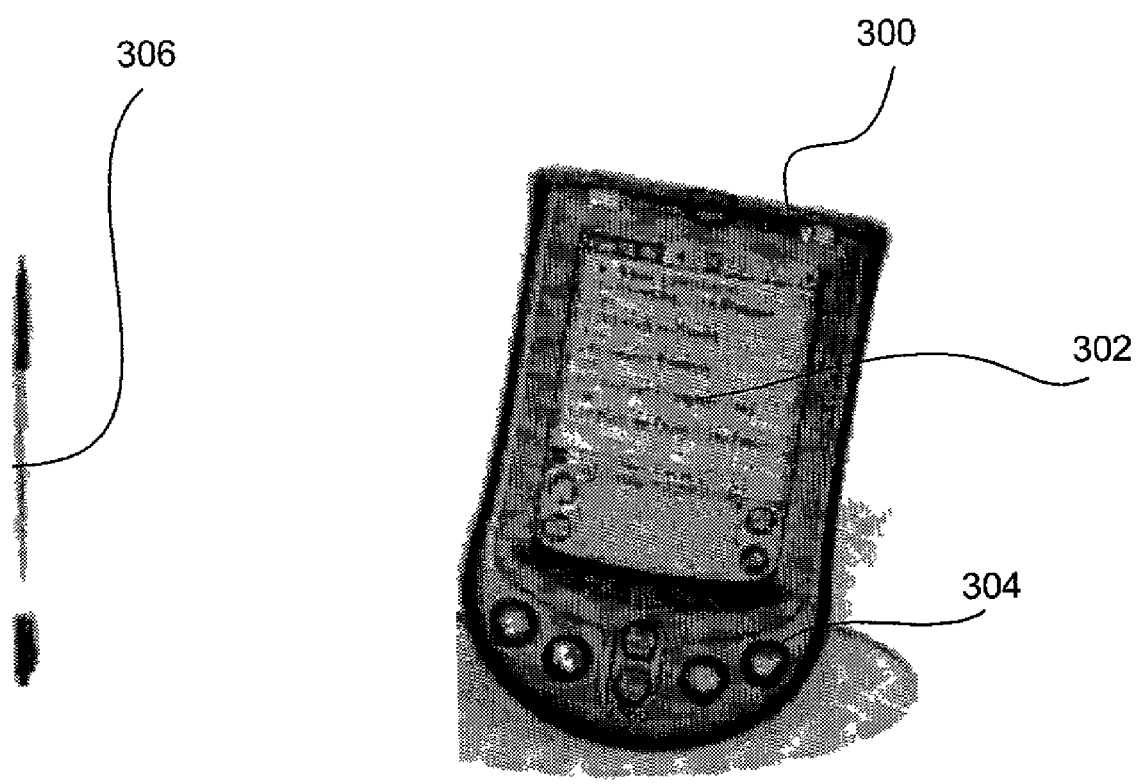
FIG. 3 illustrates an exemplary wireless thin client device.

In one embodiment, each networked thin client device is a handheld, palm-sized computer. FIG. 3 illustrates an exemplary wireless thin client device 300. Such wireless device 300 is preferably constructed with a plastic case housing a display panel 302, a keypad 304, and a stylus 306.

In the present description, use of the term "networked thin client device" is meant to include a wide variety of personal computing devices with any one or more of various features. For example, such networked devices may have: (a) a means of graphic and textual output (b) a means of pixel-oriented spatial input and textual input and/or (c) a means of networking with other like devices and with a server. Optionally they devices may have a means of peer-to-peer communication with a single, appropriately equipped partner device. Embodiments could include but are not limited to: personal digital assistants, handheld gaming toys, cell phones, graphing calculators, tablet-based computers, and personal computers.

One preferred embodiment is battery powered; alternative embodiments can use any appropriate power source. One preferred device has a plastic or metal case; alternative embodiments can use any casing material appropriate for devices that will be handled by participants. One preferred device provides conveniences such as a cover for protecting the display and a contrast control; alternative embodiments might not have such conveniences, or many more conveniences might be provided. A variety of software can be run on one preferred devices, including address, datebook, to-do list and notebook applications, although none of these software applications are strictly required, and many more such applications could be used in conjunction with an alternative embodiment.

In one preferred embodiment the graphic and textual output is accomplished by means of a 160×160 pixel Liquid Crystal Display (LCD) screen, capable of displaying four levels of gray. In alternative embodiments, the screen may be larger or smaller, may be black and white only, or may display more levels of gray, or may display color. This screen may or may not have a backlight. In another alternative embodiment the screen could utilize a cathode ray tube (CRT) monitor. In another alternative embodiment the screen could consist of paper with ink droplets which can be caused to display or hide digitally, in a pixel array. As additional novel display technologies arise, little effort is foreseen to embody the invention, provided that the display is controllable by software in a manner similar to the control of today's pixel displays.

In one preferred embodiment, spatial and textual input is accomplished by use of a stylus, to write upon the stylus-sensitive LCD screen. The physical contact is recognized by operation system software on the client, and made available to client programming languages as logical input, such as entering text, drawing a line, or selecting a location on the screen. Optionally, buttons on the device can be used to indicate input. In the present embodiment, buttons are used for selecting a client application, and to indicate operations within the client program. Optionally, a keyboard may be attached to the device and used to produce input. In one alternative embodiment, input might be accomplished via audio input; voice recognition software could translate voice input into commands. In another alternative embodiment, spatial input may be accomplished via a physical pointing device such as a mouse, trackball, or joystick. In another alternative embodiment, one or more buttons might be used to indicate spatial positioning. In another alternative embodiment, eye gaze recognition might be used to accomplish spatial input. As additional novel input devices arise, little effort is foreseen to embody the invention, provided that the input is made available to client software in a similar manner as stylus, keyboard, or pointing input is made available to today's client software.

One preferred embodiment incorporates an infrared (IR) emitter and sensor, which enables the exchange of messages or data with a peer device (popularly called "beaming"). The peer device may be of a similar make and model as the first device, or may be another make or model of device supporting a similar IR emitter and sensor and a compatible communications protocol. In alternative embodiments, other methods of directional communication may be used, or beaming may not be supported by the device.

One preferred embodied also uses a networked thin client as the computer for the group leader. This networked thin client has the same characteristics listed above. In alternative embodiments, a desktop or laptop computer could be used for the group leader. In alternative embodiments, the server computer might be used directly by the group leader. In alternative embodiments, an infrared or radio frequency remote control might be used by the group leader to control the server. In alternative embodiments the teacher might control the server computer through voice commands. In alternative embodiments, the teacher might control the server computer by actions on a large flat markable display, such as a whiteboard, which has been instrumented so as to send commands to the server.

In one preferred embodiment, the ANSI C programming language is used to create client software on the thin client device, utilizing the operating system provided by the manufacturer on the device. The invention, however, does not require any features specific to ANSI C, and many other programming languages could be used. Object oriented programming is a popular technique. An alternative implementation could use an object-oriented language, such as C++ or Java. Alternative embodiments could also use interpreted languages, such as Basic, or JavaScript. On some devices, there is no support for languages other than assembly language (some models of Texas Instruments' graphing calculators are examples); alternative embodiments could be written in assembly language or machine code.

In one preferred embodiment, the textual program is compiled producing object code, the object code is transferred to the client, and the client code may then be executed. In an alternative embodiment, the textual program may be compiled to a machine-independent format, such as Java byte code. The machine-independent code may then be transferred to the client, and the client code may be executed using a special program that interprets byte code and produces the desired effects (such an interpreter is conventionally called a "virtual machine"). In alternative embodiments, the textual program may be transferred to the client without prior compilation, and executed via a program called an interpreter. An interpreter reads the program directly and produces the desired effect. Basic is an example of an interpreted language.

Alternative embodiments have been described using a variety of programming languages and means of executing programs written in those languages. Although programming languages differ in the means they afford for expression, and the means they offer for execution, different programming languages can be used to the produce the equivalent input/output and information processing behaviors. No particular difficulties are foreseen in deploying the invention in alternative embodiments using any programming language that can execute on the client device and produce equivalent input and output, and perform the requisite information processing steps.

Figure 4:
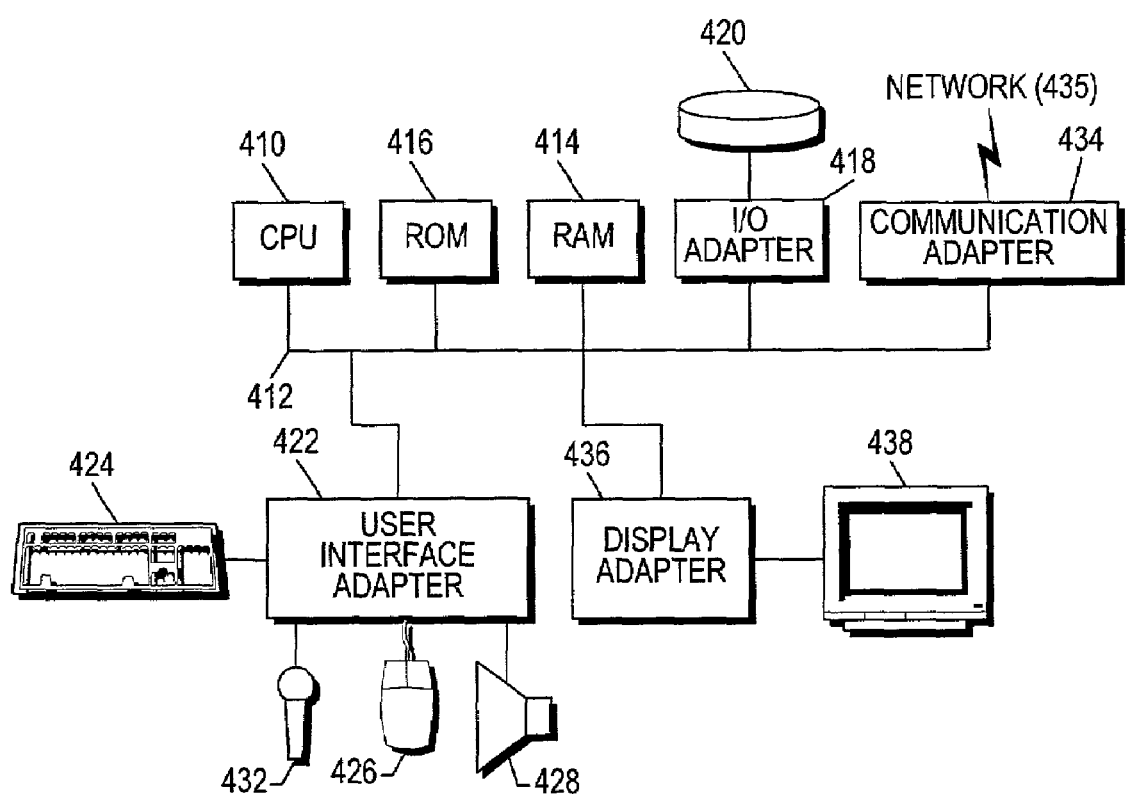
FIG. 4 shows a representative hardware environment associated with the host computer system of FIG. 2.

FIG. 4 shows a representative hardware environment associated with the host computer system of FIG. 2. Such figure illustrates a typical hardware configuration of a workstation in accordance with a preferred embodiment having a central processing unit 410, such as a microprocessor, and a number of other units interconnected via a system bus 412.

The workstation shown in FIG. 4 includes a Random Access Memory (RAM) 414, Read Only Memory (ROM) 416, an I/O adapter 418 for connecting peripheral devices such as disk storage units 420 to the bus 412, a user interface adapter 422 for connecting a keyboard 424, a mouse 426, a speaker 428, a microphone 432, and/or other user interface devices such as a touch screen (not shown) to the bus 412, communication adapter 434 for connecting the workstation to a communication network 435 (e.g., a data processing network) and a display adapter 436 for connecting the bus 412 to a display device 438.

In one preferred embodiment, the server computer is a stock Power Macintosh G4 with an 802.11b networking card installed. This server computer has a central processing unit, random access memory (RAM), read only memory (ROM), disk storage, Ethernet networking hardware and connectors, and capabilities for attaching input and output devices, principally a keyboard, mouse, and CRT monitor. The Power Macintosh G4 also has an antenna, card, and software support wireless networking via the IEEE 802.11b standard. The server computer has operating system software capable of executing server programs, which can intercommunicate with clients and other servers, and can access RAM, ROM, and disk storage. Alternative embodiments could use other computer hardware. A wide variety of processing chips might be used, including Pentium, SPARC, ARM, Crusoe, or other processing chips. More than one processing chip might be used in the same server. A wide variety of storage devices might be used. In alternative embodiments storage might reside on devices outside the main computer box, connected by dedicated wiring, or by general-purpose networking. In alternative servers, other physical networking layers might be supported, as will be discussed below. In alternative embodiments other operating systems might be used, such as Linux, Solaris, Window95, Window98, Windows NT, or Windows 2000. In alternative embodiments, a coordinated collection of computers might collectively act as the server. In alternative embodiments, the server might be a network appliance, with no provision for input and output devices, other than a connection to a network. In alternative embodiments, the server might also reside on a client device, with one client acting as server, or acting as both client and server. As described immediately below, there are many alternative networking embodiments. An alternative server embodiment may not have an Ethernet card and connector, but would only have the networking hardware and connectors used for its specific networking option. Likewise, if 802.11b is not the networking embodiment used, the server might not have an 802.11b card and antenna.

One preferred embodiment uses Java as the programming language on the server. In particular, the Servlet Application Programmer Interface (API) is used to write server programs. Textual server programs are compiled into Java byte code. A virtual machine executes this byte code. One preferred embodiment utilizes a Java web server program within which the program executes. In alternative embodiments the Java program could be executed in conjunction with other web server programs, such as Apache, Netscape, or Microsoft web servers. The discussion of alternative program languages presented with regard to client program also pertains to server programming. A wide variety of program languages and means of executing programs offer equivalent capabilities. Alternative embodiments could thus be constructed many different programming languages and execution facilities. A list of possible languages, which is by no means exclusive, includes C, C++, Python, Perl, Active Server Pages, Java Server Pages, JavaScript and Basic.

Networking is generally conceived of in terms of layers; although 7 or more layers are commonly used, the present discussion will be simplified to three layers: physical, transport, and application.

One preferred embodiment uses a combination of infrared (IR) beaming and Ethernet cabling as physical layer. Alternative embodiments of the physical layer could use radio frequency (RF) communication in the 900 megahertz, 2.4 Gigahertz, or other spectrums, as an alternative to IR. Alternative embodiments could also use wired connections to a partner device (such as a cell phone) which is then connected to the network. It is the nature of internet protocols to allow many combinations of physical topology and infrastructure to interoperate, and thus endless combinatorics prevent us from listing all possible alternative embodiments of the physical layer. At any rate, any physical layer will suffice as long as it connects the devices and allows a suitable network protocol to be used to exchange information among them.

One preferred embodiment uses TCP/IP for the middle transport layers. For IR communication Point to Point Protocol (PPP) is used over irDA to make a TCP/IP connection to a wired Ethernet switch, which then provides TCP/IP connectivity to the rest of the wired network. One preferred embodiment runs TCP/IP over PPP over irDA. Alternative embodiments could use TCP/IP over Bluetooth, 802.11, or HomeRF standards. An alternative embodiment could substitute AppleTalk, a newer version of TCP/IP or another transport protocol for the present use of TCP/IP. Transports are generally equivalent, for the purposes herein, provided they can deliver messages between the two addressable devices in a timely and reasonably dependable fashion, and those messages can support an application protocol such as HTTP and data such as XML.

Sockets are used at the application layer, using a custom protocol for communication. This protocol is a simplified version of the HyperText Transport Protocol (http), and allows for requesting information from the server via GET operations and sending information to the server via POST operations. A secondary socket channel is also used to send change notification messages from server to client. The protocol for this channel consists of POSTing a "changed" message with optional timestamp information, as well as an optional indication as to what changed. An alternative embodiment could use the Object Exchange protocol (OBEX). Another alternative embodiment could use HTTP 1.0 or greater; many programming languages contain libraries or classes that directly support these protocols without direct reference to sockets. Little difficulty is foreseen in using alternative logical representations of a communications channel between devices, so long as it provides read and write operations that receive and send structured textual and/or binary data between addressable devices, along the lines of the http get and post messages.

One preferred embodiment uses a simplified form of the extensible markup language (XML) for structuring the data messages which are exchanged among clients and the server. An alternative embodiment could use HTML. An alternative embodiment could use a binary message format that contains equivalent information. An alternative embodiment could use XML without simplification. An alternative embodiment could use another structured text description language, so long as matching encoders and decoders can be written for both sides of the communication channel.

One preferred embodiment includes a public display, visible by the group leader and group participants. A computer projector is used to cast this image upon a reflective, flat surface at the front of the room. In alternative embodiments, a wide variety of projection technologies could be used. The projection could be from in front of or behind the screen. The projection unit might contain a light source, or rely upon an external light source. In alternative embodiments, the large public display might be large CRT monitor or LCD display. In alternative embodiments, participants may not be in the same room, and the "public" display may be a display area reserved for this purpose on their remote computer or device. In general, any device may serve as the public display as long as (1) it can display computer graphics images (2) the computer graphics images can be controlled by a computer, such as the server or the group leader's computer, (3) all participants can see it when required by the group activity to do so.

Figure 5:
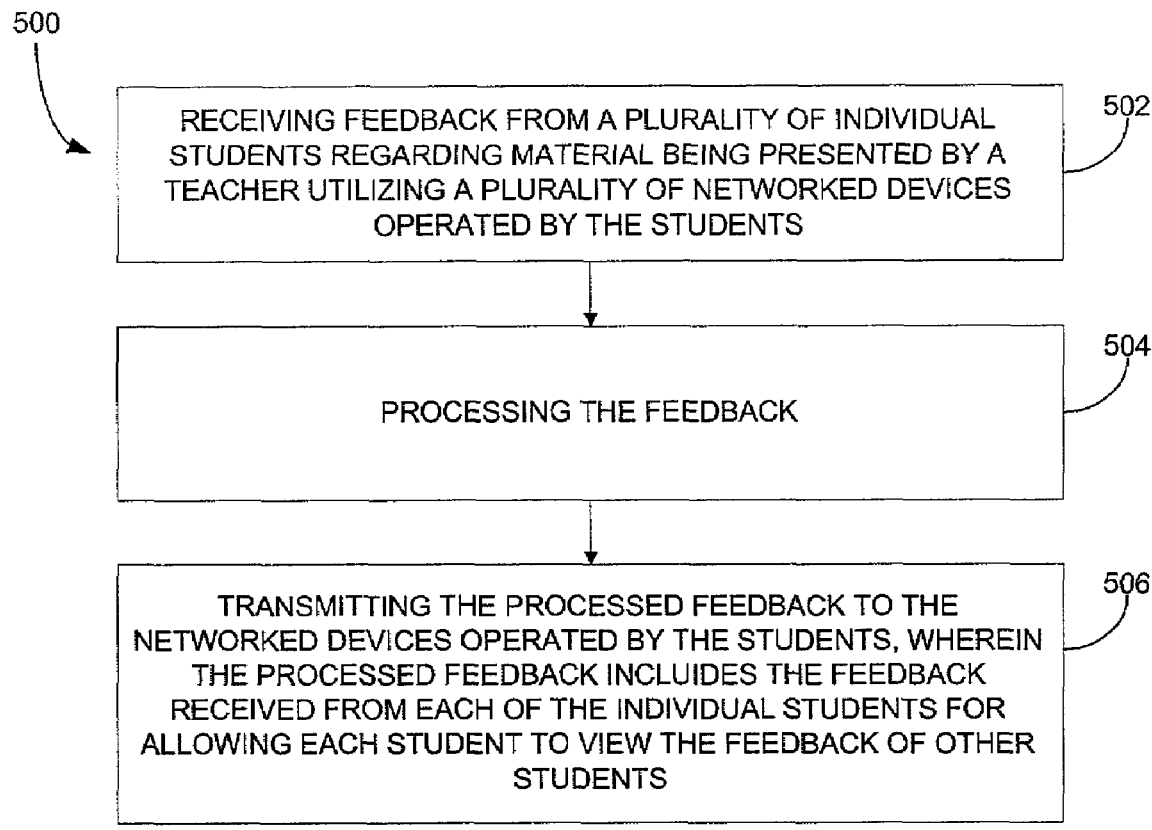
FIG. 5 illustrates a method for enhancing participation in an educational environment using networked devices.

FIG. 5 illustrates a method 500 for enhancing participation in an educational environment (Note FIG. 1) using networked devices. In one embodiment of the present invention, the networked devices may include thin client devices. Further, such thin client devices may include wireless devices. Still yet, the wireless devices may include hand-held wireless devices such as personal digital assistants (PDAs) each including a stylus, as set forth hereinabove during reference to FIGS. 2 and 3. It should be noted, however, that any type of networked devices may be employed per the desires of the user.

Initially, in operation 502, feedback is received from a plurality of individual students regarding material being presented by a teacher utilizing a plurality of networked devices operated by the students. It should be noted that the present invention may be utilized in any environment where there are individual group members, i.e. students, and at least one group leader, i.e. teacher.

Such feedback may be collected in any desired manner that provides a status of understanding of the material being presented among the students. For example, multiple choice questions, responses to graphical displays, sliders, etc. may be employed.

Figure 6:
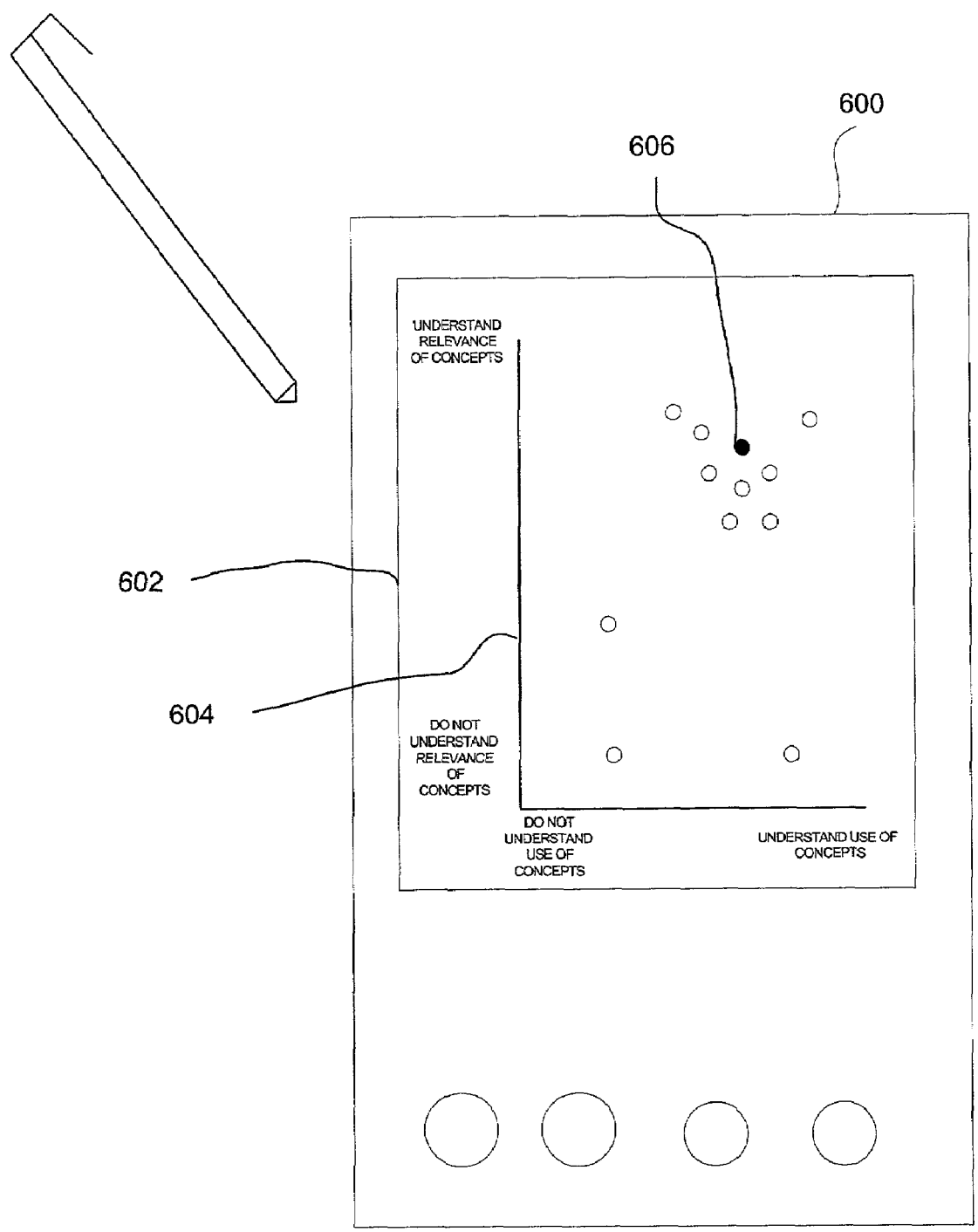
FIG. 6 illustrates one exemplary display that may be used to collect feedback.

FIG. 6 illustrates one exemplary display 600 that may be used to collect feedback. As shown, a multi-dimensional map 602 may be displayed on each of the devices. Such map 602 may include at least two axes 604 each indicating a parameter of feedback. In one embodiment, such parameters may include the ability to understand the use of concepts being presented, and the ability to understand the relevance of the concepts being presented. As shown in FIG. 6, two dimensions such as "I understand/don't understand how to use the concept the teacher is discussing" and "I understand/don't understand the relevance of the concepts the teacher is discussing" may be employed.

By using graphical displays, multiple choice questions, etc., the students may be allowed to provide feedback by a single touch of the display of the devices. FIG. 6 illustrates an exemplary selection 606 made by one of the students. Such selection 606 indicates a degree of understanding regarding the parameters displayed.

After the feedback is received from the students in operation 502, such feedback is subsequently processed. Note operation 504. Such processing may include the receipt of feedback, aggregation of feedback, or any other step required to enable the subsequent operation (operation 506). It should be noted that the processing may take place on the host computer, the devices themselves, or a combination thereof.

The processed feedback is then transmitted to the networked devices operated by the students, as indicated in operation 506. Such processed feedback includes the feedback received from each of the individual students thus allowing each student to view the feedback of other students.

Further, the feedback may be also transmitted to the teacher. In such a case, the various feedback may be aggregated and presented in a manner that allows the teacher to make an assessment of the level of understanding of the class with minimal effort. For example, the feedback may be presented in the form of a graph, pie chart, etc.

In one embodiment, the feedback may be anonymously submitted, and relayed. In another embodiment, the feedback may be identified based on the individual students that transmitted the same thus allowing each student to identify a source of the feedback. Whether the feedback is anonymously submitted may be left to the discretion of the students, the teacher or a combination thereof.

Moreover, the processed feedback may be transmitted to the networked devices operated by each of the students only after the feedback is received therefrom. As such, students might be able to see other students' ratings only after they have entered their own. This may be effective in order to avoid students who observe but do not participate, i.e. lurkers, and further motivate participation.

Optionally, an age of the feedback may be monitored such that the feedback may be modified (i.e. erased, hidden, etc.) upon the age reaching a predetermined amount. Such predetermined amount of time may be left to the discretion of the students, the teacher or a combination thereof.

One example of use of the present invention will now be set forth. It is important to note that the present example is merely for illustration purposes, and should not be construed as limiting in any manner. The general principles of the present invention may be applied in any desired manner to accomplish varying objectives.

In operation, a teacher may engage in the presentation of material in front of the class. Such material may take any form such as mathematics, social studies, etc. At any point during such presentation, students may provide the feedback. In the case where a display similar to FIG. 6 is used, the students may simply touch the display using the stylus. As an option, the teacher may actually prompt the students to provide feedback utilizing the hand held devices.

Such feedback is subsequently received by a host computer via a wireless or hard line communication medium. Thereafter, the feedback may be aggregated. The feedback is then transmitted back to the handheld devices of the students, and even the teacher. It should be noted that the aggregation and/or transmission of the feedback may be accomplished when the feedback is all received, or in real-time as the feedback is received.

The present embodiment thus allows students to anonymously indicate a state of understanding on a networked device, and receive back a visualization indicating how many other students share their state. As students mark a place on the screen, indicating their state of understanding, they may receive instant feedback about how many other students are in a similar space. As students sees many other students with a similar rating, one of the students will be more emboldened to participate and ask a question.

Figure 7:
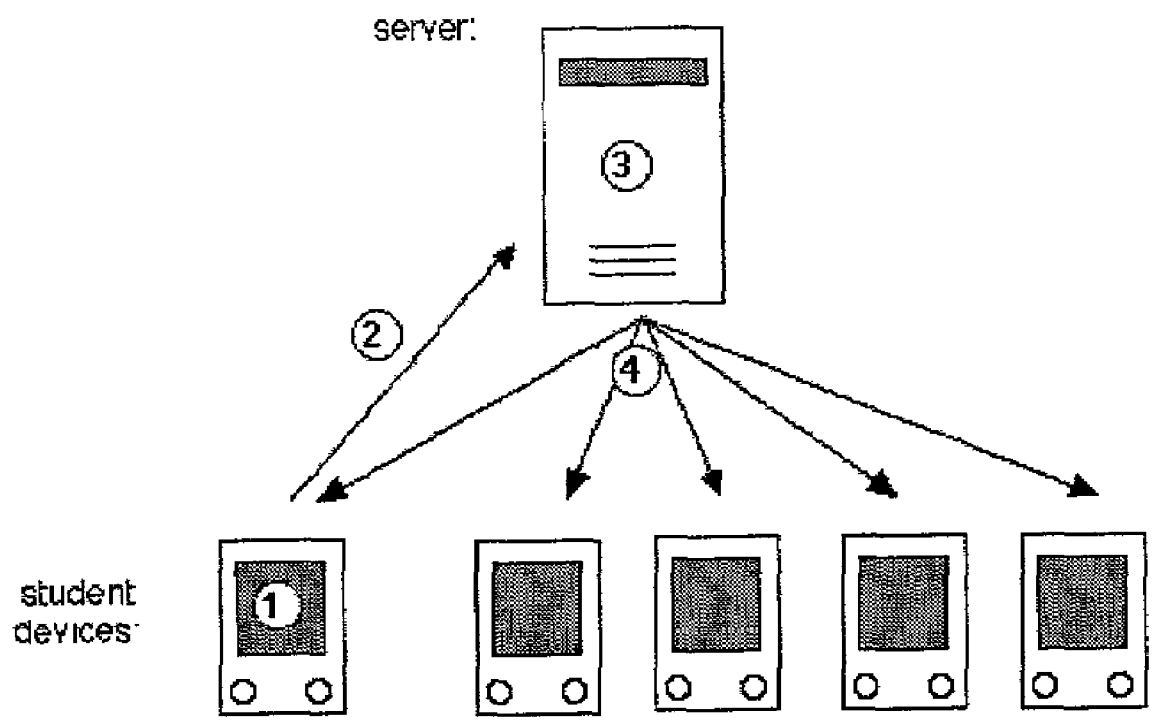
FIG. 7 illustrates an exemplary flow of operation, in accordance with one embodiment of the present invention.

FIG. 7 illustrates an exemplary flow of operation, in accordance with one embodiment of the present invention. As shown, students may indicate their feedback on the devices. Further, such feedback may be transmitted to the server, after which it is processed. Still yet, the processed feedback may be made available to other devices. Optionally, such processed feedback may be made available only after other devices meet some condition.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for enhancing participation in an educational environment using networked devices, comprising the steps of:
   (a) receiving individual items of feedback from each plurality of individual group members regarding material being presented by a group leader utilizing the plurality of networked devices operated by the plurality of individual group group members, wherein the plurality of networked devices include wireless thin client devices;
   (b) aggregating the individual items of feedback received from at least two of said plurality of individual group members to produce an item of aggregated feedback; and
   (c) transmitting the item of aggregated feedback to the plurality of networked devices operated by the plurality of individual group members,
   wherein each of the individual items of feedback of the aggregated feedback is graphically displayed on each of the plurality of networked devices as an indicator on a multidimensional map having at least two axes, each of the at least two axes indicating a feedback parameter, such that the indicator indicates a degree of understanding of the material held by a corresponding one of the plurality of individual group members with respect to the feedback parameter indicated by each of the at least two axes.

2. The method as recited in claim 1, wherein the plurality of individual group members includes students, and the group leader includes a teacher.

3. The method as recited in claim 1, wherein the wireless thin client devices include hand-held wireless devices.

4. The method as recited in claim 3, wherein the wireless thin client devices include personal digital assistants (PDA5) each including a stylus.

5. The method as recited in claim 1, and further comprising the step of allowing the plurality of individual group members to provide the individual items of feedback by a single touch of the display of the plurality of networked devices.

6. The method as recited in claim 5, wherein the individual items of feedback are displayed on the multi-dimensional map of each of the plurality of networked devices, thus allowing each of the plurality of individual group members to view individual items of feedback received from a remainder of the plurality of individual group members.

7. The method as recited in claim 1, wherein the individual items of feedback include answers to multiple choice questions.

8. The method as recited in claim 1, and further comprising the step of transmitting the item of aggregated feedback to the group leader.

9. The method as recited in claim 1, wherein each of the individual items of feedback is identified based on the individual group member who transmitted the same, thus allowing each of the individual group members to identify a source of an individual item of feedback.

10. The method as recited in claim 1, and further comprising the step of monitoring an age of an individual item of feedback, and modifying the individual item of feedback upon the age reaching a predetermined amount.

11. The method as recited in claim 1, wherein the aggregating is carried out by a server.

12. The method as recited in claim 11, wherein the server is coupled with the plurality of networked devices.

13. The method as recited in claim 1, wherein the item of aggregated feedback includes the individual items of feedback received from each of the individual group members for allowing each of the individual group members to view the feedback of a remainder of the individual group members.

14. The method of claim 1, wherein the item of aggregated feedback is transmitted to a networked device of the plurality of networked devices which is operated by an individual group member of the plurality of individual group members only after an individual item of feedback is received from the individual group member.

15. A storage device storing an executable program for enhancing participation in an educational environment using a plurality of networked devices, the program executed by a processor to perform steps comprising:
   (a) receiving individual items of feedback from each of a plurality of individual group members regarding material being presented by a group leader utilizing the plurality of networked devices operated by the plurality of individual group members, wherein the plurality of networked devices includes wireless thin client devices; underotanding of the material held by a correoponding one of the plurality of individual group membero with reopect to the feedback parameter indicated by each of the at leapt two axec (b) aggregating the individual items of feedback received from at least two of said plurality of individual group members to produce an item of aggregated feedback; and (c) transmitting the item of aggregated feedback to the plurality of networked devices operated by the plurality of individual group members, wherein each of the individual items of feedback of the aggregated feedback is graphically displayed on each of the plurality of networked devices as an indicator on a multidimensional map having at least two, each of the at least two axes indicating a feedback parameter, such that the indicator indicates a degree of understanding of the material held by a corresponding one of the plurality of individual group members with respect to the feedback parameter indicated by each of the at least two axes.

16. The storage device of claim 15, wherein the item of aggregated feedback is transmitted to a networked device of the plurality of networked devices which is operated by an individual group member of the plurality of individual group members only after an individual item of feedback is received from the individual group member.

17. A host computer system for enhancing participation in an educational environment using a plurality of networked devices, comprising:

a communication adapter for connecting the host computer system to a network to which the plurality of networked devices is connected; and a central processing unit coupled to the communication adapter and configured to execute a program performing steps comprising:

receiving individual items of feedback from each of a plurality of individual group members regarding material being presented by a group leader utilizing the plurality of networked devices operated by the plurality of individual group members, wherein the plurality of networked devices includes wireless thin client devices;

aggregating the individual items of feedback received from at least two of said plurality of individual group members to produce an item of aggregated feedback; and transmitting the aggregated feedback to the plurality of networked devices operated by the plurality of individual group members, wherein each of the individual items of feedback of the aggregiated feedback is graphically displayed on each of the plurality of networked devices as an indicator on a multidimensional map having at least two axes, each of the at least two axes indicating a feedback parameter, such that the indicator indicates a degree of understanding of the material held by a corresponding one of the plurality of individual group members with respect to the feedback parameter indicated by each of the at least two axes.

18. The host computer system of claim 17, wherein the item of aggregated feedback is transmitted to a networked device of the plurality of networked devices which is operated by an individual group member of the plurality of individual group members only after an individual item of feedback is received from the individual group member.

* * * * *